United States Patent [19]

Koci

[11] Patent Number: 5,074,887
[45] Date of Patent: Dec. 24, 1991

[54] AQUEOUS DYE PREPARATIONS: WATER-INSOLUBLE DYE, ANIONIC DISPERSANT, LACTATE, GLYCEROL OR PROPYLENE GLYCOL, POLYMER AND BETAINE

[75] Inventor: Zdenek Koci, Binningen, Switzerland

[73] Assignee: Ciba-Geigy Corporation, Ardsley, N.Y.

[21] Appl. No.: 602,027

[22] Filed: Oct. 23, 1990

[30] Foreign Application Priority Data

Oct. 27, 1989 [CH] Switzerland .................. 3900/89

[51] Int. Cl.$^5$ .............................................. C09B 67/46
[52] U.S. Cl. ........................................... 8/527; 8/532; 8/557; 8/558; 8/589; 8/597; 8/599; 8/602; 8/610; 8/922
[58] Field of Search ................... 8/527, 599, 610, 617, 8/589

[56] References Cited

U.S. PATENT DOCUMENTS 4,563,189  1/1986  Lewis ...................................... 8/493
4,923,481  5/1990  Galli et al. ............................. 8/589

Primary Examiner—A. Lionel Clingman
Attorney, Agent, or Firm—George R. Dohmann; Edward McC. Roberts

[57] ABSTRACT

Aqueous dye preparations are described which contain 15-40% by weight of dyes, 3-18% by weight of an anionic dispersant of the formula (1), 1-10% by weight of sodium lactate, 1-10% by weight of glycerol and/or propylene glycol, 0.1-5% by weight of a compound having monomer units of the general formula (2), 3-10% by weight of betaine monohydrate, 0-4% by weight of a compound having monomer units of the general formula (3) and 0.1-15% by weight of customary auxiliaries; preparations of this type have a long shelf life, are highly redispersible and do not form sediments; they are suitable in particular for the continuous dyeing of polyester textile materials or mixtures thereof with cellulose textile materials.

18 Claims, No Drawings

AQUEOUS DYE PREPARATIONS: WATER-INSOLUBLE DYE, ANIONIC DISPERSANT, LACTATE, GLYCEROL OR PROPYLENE GLYCOL, POLYMER AND BETAINE

The present invention relates to aqueous dye preparations, a process for their preparation and their use for the dyeing, in particular for the continuous dyeing, or printing of textile materials and to the dyed material.

It is known to use disperse dyes in liquid or powdered (granulated) commercial grades for the dyeing or printing of textile materials made of polyester (PES) or preferably made of mixtures of polyester with other fibres, in particular of natural fibres, for example PES/cellulose fibres (PES/Cel). Various other dye classes, such as vat, reactive, sulfur, leuko-vat, naphthol or substantive dyes can be used for the simultaneous dyeing of the, for example cellulose, fibres.

For reasons of productivity and costs, today PES/Cel dyeings are advantageously carried out in one-bath continuous dyeing processes with the addition of various auxiliaries. All these processes make very high demands, for example, on the physical, chemical and application properties of the disperse dye preparations, only some of which could be met so far.

In particular those disperse dye preparations are required which have a generally good shelf life. The preparations are not supposed to agglomerate during storage (otherwise specks are formed during the dyeing) and should be very stable to drying out (readily redispersible). A further requirement is that the preparations are stable in the dye liquor, do not foam and do not stain the non-PES fibre portion or, if this fibre portion becomes stained, can be easily removed by washing.

When disperse dye preparations are used together with various types of reactive dyes for the dyeing of cellulose in a dye application bath, a further requirement is that the colour yield of the reactive dyes, in particular if they are highly reactive, is not substantially impaired by the disperse dye preparation. Finally, level dyeings are required, which in continuous dyeing processes can only be achieved with disperse dyes having low migration.

Surprisingly, specific aqueous dye preparations have now been found which, in addition to the dye which is insoluble to sparingly soluble in water, contain a mixture of an anionic dispersant containing no hydroxyl or amino groups and being preferably present in a low-salt relatively hydrophobic (ratio of carbon to organic sulfur > 15:1) form with compounds of the general formula (2) and additionally with a combination of sodium lactate and glycerol and/or propylene glycol, which fulfil the abovementioned requirements all at the same time. In particular, these dye preparations have, in addition to a good shelf life and redispersibility, also good application properties.

The present invention accordingly relates to aqueous dye preparations of dyes which are insoluble or sparingly soluble in water and contain 15-40% by weight of dye,
3-18% by weight of an anionic dispersant of the general formula

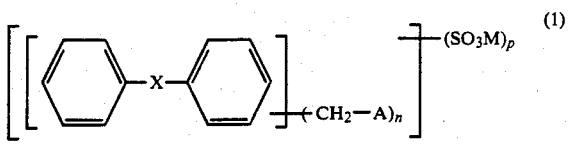

in which
X is a direct bond or oxygen
A, is hydrogen or the radical of an aromatic compound, which is bound to the methylene group via a ring carbon atom and does not have any hydroxyl or amino substituents
n and p, independently of one another, are each a number from 1 to 4 and
M is a monovalent cation, and
if appropriate, condensation products of these compounds with formaldehyde,
1-10% by weight of sodium lactate,
1-10% by weight of glycerol and/or propylene glycol,
0.1-5.0% by weight of a compound having monomer units of the general formula

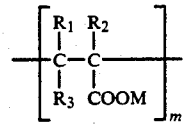

in which
$R_1$ is H, $C_1$-$C_3$alkyl, COOM
$R_2$ is H, $C_1$-$C_3$alkyl,
$R_3$ is H, $C_1$-$C_3$alkyl, $CH_2COOM$
M is a monovalent cation and
m is a number from 8-1000,
3-10% by weight of betaine monohydrate,
0-4% by weight of a compound having monomer units of the general formula

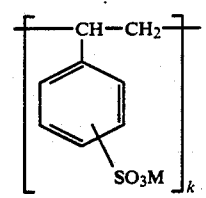

in which M is a monovalent cation and
k is a number from 50 to 3000, and
0.1-15% by weight of customary auxiliaries.

The anionic dispersants usable according to the invention and containing no hydroxyl or amino groups which are used are sulfonated condensation products of the general formula

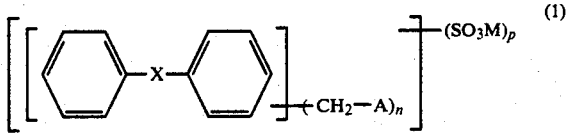

in which X is a direct bond or oxygen, A is hydrogen or the radical of an aromatic compound, which is bound to the methylene group via a ring carbon atom and has no hydroxyl or amino substituents, M is a monovalent cation, and n and p, independently of one another, are each a number from 1 to 4, and, if appropriate, condensation products of these compounds with formaldehyde.

M is preferably Na, K, Li or triethanolamine.

As a rule, the values for n and p are integers. They can also be any desired fractional number in the range from 1 to 4, for example 1.4, 1.8, 2.1 or 3.2. Preferably, n and p, independently of one another, are 1 or 2.

In the case where A in formula (1) is hydrogen, the dispersant is a di-tolyl ether sulfonic acid/formaldehyde condensation product.

However, the anionic dispersant used is in particular one of the general formula

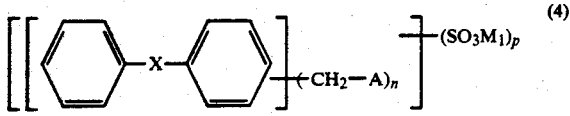

(4)

in which

X is a direct bond or oxygen,

A is the radical of an aromatic compound, which is bound to the methylene group via a ring carbon atom and has no hydroxyl or amino substituents, n and p, independently of one another, are each a number from 1 to 4, and $M_1$ is Na, K, Li or triethanolamine.

Preferably, an anionic dispersant of the general formula

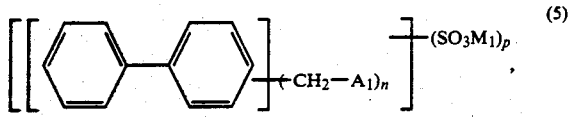

(5)

is used in which $A_1$ is the radical of an aromatic hydrocarbon which is bound to the methylene group via a ring carbon atom and has no hydroxyl or amino substituents, and n and p, independently of one another, are each a number from 1 to 4 and $M_1$ is Na, K, Li or triethanolamine.

Particularly preferably, an anionic dispersant of the general formula

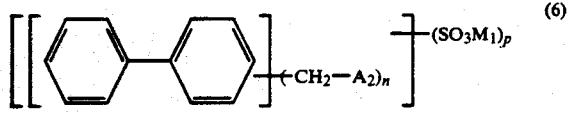

(6)

is used in which $A_2$ is a naphthalene radical which is bound to the methylene group via a ring carbon atom and has no hydroxyl or amino substituents, n and p, independently of one another, are each a number from 1 to 4 and $M_1$ is Na, K, Li or triethanolamine.

The sulfonated condensation products usable according to the invention are advantageously prepared in such a manner that an aromatic compound containing at least two replaceable ring hydrogen atoms but no hydroxyl or amino substituents is reacted with a compound of the general formula

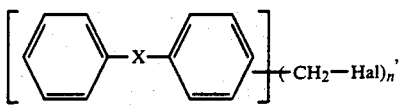

(8)

in which

X is a direct bond or oxygen

Hal is chlorine or bromine n is a number from 1 to 4, and the condensation product is sulfonated. Condensation products of the type mentioned can also be prepared by reacting a sulfonated aromatic compound which contains at least two replaceable ring hydrogen atoms and no hydroxyl or amino substituents with a compound of the formula (8).

The aromatic compounds which serve as starting materials in the preparation of the condensation products and contain at least two replaceable hydrogen atoms can be mono-or polynuclear, in particular dinuclear, aromatic hydrocarbons which are substituted or unsubstituted. Examples of suitable substituents are alkyl groups of 1 to 4 carbon atoms, alkoxy groups of 1 to 4 carbon atoms or halogen, for example chlorine. Naphthalene compounds, which may be substituted by chlorine or methyl, are preferred. Examples of mono- and polynuclear aromatic compounds are: alkylbenzenes, such as toluene, xylenes, isopropylbenzene, isobutylbenzene, tert-butylbenzene, alkoxybenzenes, such as anisoles, phenetols, butoxybenzene, furthermore diphenylalkanes, tetrahydronaphthalene, naphthalene, alkylnaphthalenes, for example α- and β-methylnaphthalene, and acenaphthene, anthracene, perylene, pyrene and dihydrophenanthrene.

Naphthalene or naphthalenesulfonic acids are particularly suitable. It will be appreciated that mixtures of these mono- and polynuclear aromatic compounds can also be used as starting materials.

The compounds of the formula (8), which are also required as starting materials, are prepared, for example, by reaction of diphenyl or diphenyl ether with formaldehyde and hydrogen halide, such as hydrogen bromide or preferably hydrogen chloride by the methods described in U.S. Pat. No. 3,004,072 or IT-A-600,124.

Preferred starting materials of the formula (8) are chloromethyldiphenyl and chloromethyldiphenyl ether. In most cases, these compounds are mixtures of isomers containing 1 to 3 chloromethyl groups, the chloromethyl groups, for example, being preferably in the o- or p-position of the two benzene rings. Accordingly, the corresponding sulfonated condensation products also are, as a rule, present as mixtures, in particular of mono- to trisubstituted diphenyl or diphenyl ether products. Depending on the starting materials and the reaction conditions chosen in the preparation of the condensation products, the ratio of the isomers to one another changes. The sulfonated condensation products are described in DE-A-235,691.

The anionic dispersant according to the invention preferably has a carbon to organically bound sulfur ratio >15:1. The anionic dispersant is preferably used in a low-salt form, which means that the amount of electrolyte in the dry dispersant, expressed as $Na_2SO_4$, is less than 1% by weight.

The reverse osmosis (RO) membranes which can be preferably used for desalting the anionic dispersant essentially consist of an organic polymer which is modified at least on the surface by radicals containing ionic groups. Natural, semi-synthetic or synthetic polymers modified in this manner can be processed to give membranes. A polymeric substance to be modified in this manner contains, as reactive atoms or groups, for example, hydroxyl, halogen, halogenoalkyl, amino and/or amidoxime groups. It can then be reacted with suitable compounds which on the one hand contain ionic groups and on the other hand at least one grouping which can react with the formation of a chemical (covalent) bond.

For example, the following polymeric compounds can be modified in the manner mentioned:
cellulose acetates, for example those having a low acetyl group content, but also more highly acylated cellulose, for example secondary acetate,
polyvinyl alcohols,
polyacrylonitrile or copolymers of acrylonitrile with other ethylenically unsaturated monomers,
polysulfones
polystyrenes
polyamides or
polyimides.

These types of membranes are known, for example, from U.S. Pat. Nos. 4,604,204, 4,584,103, 4,753,725, 4,690,766, 4,477,634 and 4,720,345.

The membranes can have different forms, for example they can be present in the form of plates, sheets, tubes, in the form of a pocket, a cone or of hollow fibres. In order to be used effectively for the separation of compounds, they have to be integrated into suitable systems (modules) and incorporated in installations (for pressure permeation).

The membranes described which are used for separating/purifying the starting solutions or suspensions mentioned by the principle of ultrafiltration are essentially those having separation limits in the molecular weight range from 300 to 800, preferably 400 to 500, and which are symmetrical or in particular asymmetrical. Water and dissolved substances which because of their molecular weight are below the separation limit easily permeate through these membranes upon application of a small to medium pressure. According to the invention, pressures of 10 to 100 bar and preferably 10 to 30 bar are applied. The pressure can be exerted, for example, by means of a pump. Depending on the membrane used, pH values and temperatures can vary within wide limits when the process is carried out.

1,2-Propylene glycol is preferably used as the propylene glycol.

Preferred compounds of the formula (2) are those having monomer units of the general formula

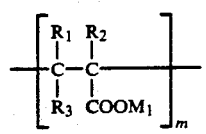

(9)

in which
$R_1$ is H, $C_1-C_3$alkyl, -COOM,
$R_2$ is H, $C_1-C_3$alkyl,
$R_3$ is H, $C_1-C_3$alkyl, -CH$_2$COOM,
$M_1$ is Na, K, Li, triethanolamine and
m is a number from 8 to 1000.

These carboxyl-containing polymerization products are known. Polymerization products which are used preferably are homopolymers of acrylic, methacrylic or maleic acid or their copolymers in the form of their sodium salts having a molecular weight of about 1,000 to 100,000, preferably 1,000 to 30,000.

As humectant, a mixture of sodium lactate (in the form of an in particular 50% or 60% aqueous solution) and glycerol and/or propylene glycol is used in amounts of preferably 7 to 12% in the dye preparation according to the invention.

Surprisingly, it was further found that the viscosity of the dye preparation can be regulated, depending on the ratio of sodium lactate to glycerol and/or propylene glycol.

If desired, the dye preparation according to the invention can contain a compound having monomer units of the general formula (3). These compounds are likewise known. Preferably, sodium polystyrenesulfonate of a molecular weight (MW) of about 500,000 is used for regulating the viscosity of the dye preparation and for obtaining a minimum sediment after an extensive time of storage. The sediment in general has a soft, readily homogenizable and readily redispersible form.

Further components of the disperse dye preparations according to the invention are betaine monohydrate to promote the redispersibility and conventional auxiliaries, for example anti-foams, for example 2,4,7,9-tetramethyl-5-decyne-4,7-diol; polypropylene glycol MW 10,000, N,N-dimethyloleylamide and preservatives, for example chloroacetamide, hydroxymethylchloroacetamide.

The dyes used in the dye preparations according to the invention are in particular disperse dyes having a water solubility of less than 1 g/l at a temperature of 20° C. and belonging to a wide range of chemical classes. Examples are carboxyl- and sulfo-containing nitro, aminoketone, ketoneimine, methine, polymethine, diphenylamine, quinoline, benzimidazole, xanthene, oxazine or coumarin dyes and in particular anthraquinone and azo dyes, such as mono- or disazo dyes. Examples of suitable disperse dyes are listed in Colour Index under "Disperse dyes".

Preference is given to aqueous dye preparations containing
15–40% by weight of disperse dye,
3–18% by weight of an anionic dispersant of the general formula

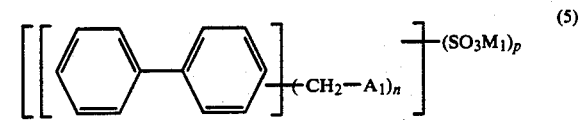

(5)

in which
$A_1$ is the radical of an aromatic hydrocarbon which is bound to the methylene group via a ring carbon atom and has no hydroxyl or amino substituents
n and p, independently of one another, are each a number from 1 to 4 and
$M_1$ is Na, K, Li or triethanolamine,
1–10% by weight of sodium lactate,
1–10% by weight of glycerol and/or propylene glycol,
0.1–5% by weight of sodium polyacrylate, sodium polymethacrylate, sodium polymaleate, mixtures thereof or copolymers thereof having an MW between 1,000 and 100,000,
3–10% by weight of betaine monohydrate, 0-4% by weight of a compound having monomer units of the general formula

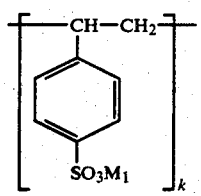

in which

M is Na, K, Li, triethanolamine and k is a number from 50 to 3000, and 0.1-15% by weight of customary auxiliaries.

Particular preference is given to aqueous dye preparations containing 18-32% by weight of disperse dye, 5-12% by weight of an anionic dispersant of the general formula

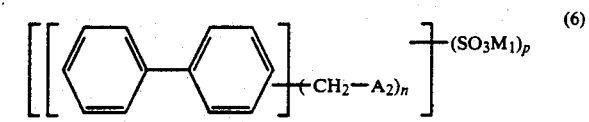

in which $A_2$ is a naphthalene radical which is bound to the methylene group via a ring carbon atom and has no hydroxyl or amino substituents n and p, independently of one another, are each a number from 1 to 4, $M_1$ is Na, K, Li or triethanolamine, 7-12% by weight of a mixture of sodium lactate and glycerol and/or 1,2-propylene glycol, 1-3% by weight of sodium polyacrylate of an MW between 1,000 and 30,000, 5-9% by weight of betaine monohydrate, 0-1% by weight of sodium polystyrenesulfonate of an MW between 400,000 and 600,000 and 0.1-5% by weight of customary auxiliaries.

The disperse dye preparations according to the invention can be used in continuous dyeing processes, for example pad-thermosol for PES fibres or in all 1-and 2-bath dyeing processes for PES/Cel fibres, for example pad-thermosol/pad-batch or thermosol/thermofixing processes with and without the addition of alkali (NaHCO$_3$), using reactive dyes, and in pad-thermosol/-pad-steam processes, using vat or reactive dyes.

The disperse dye preparations according to the invention can also be used in various printing processes for PES and PES/Cel fibres in combination with natural thickeners and in the high-temperature exhaust process for PES or PES/Cel fibres together with suitable dyes for cellulose fibres with addition of 1-3 g/l of anionic dispersants, for example lignosulfonates, or condensation products of phenols, naphtholsulfonic acids, sodium sulfite and formaldehyde and the like.

The disperse dye preparations according to the invention are obtained, for example, by adding the disperse dye or a mixture of disperse dyes to an aqueous solution of the anionic dispersant and homogenizing the mixture at room temperature for 20 to 30 minutes. The further components according to the invention are then added, and the dispersion is milled while wet. These further components can also be added before, during or after the wet milling process.

For the wet milling, the customary colloid mills, vibrating and ball mills, pinned disc mills, vibromills, dissolvers and submicron dispersers can be used as high-performance dispersing apparatuses. However, it is preferred to use microsol mills or continuous stirred mills containing milling media, preferably those consisting of SiO$_2$ and having a diameter of 0.2-5 mm, glass bead mills or sand mills. The dispersion is milled until the particle size of the dye particles is less than 10μ, in particular less than 2μ. The dispersion is then separated off from the milling auxiliaries.

In a further embodiment, the disperse dye preparation can also contain further dyes, for example reactive dyes. Preferred reactive dyes are those having a halogenotriazinyl group as reactive group, for example chlorotriazinyl dyes. The abovementioned dyes are preferably used in a low-salt form, which can be obtained in a similar manner as described for the dispersant by reverse osmosis.

The overall dye content of the preparations is about 15-40% by weight. They are prepared analogously to the processes described for the preparation of disperse dye preparations, it also being possible, for example, for the reactive dye to be added at the end to the ready-to-use dispersion.

The preparations containing a mixture of disperse and, for example, reactive dye, have a long shelf life and the same good properties as the preparations described above which only contain disperse dye.

The examples which follow illustrate the invention, without limiting it thereto. Temperatures are given in degrees centigrade, parts and percentages are by weight. The individual tests, such as migration test, storage stability test and redispersibility test are described in DE-A-2,816,539.

EXAMPLE 1

26 parts of the disperse dye of the formula

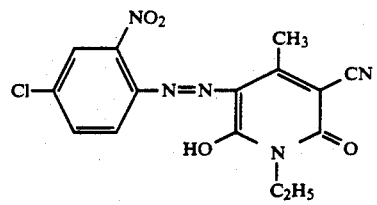

are added slowly in the form of a dry crude dye with vigorous stirring to a solution containing:

47.2 parts: of water 8 parts: of biphenylmethylnaphthalenesulfonic acid condensation product, sodium salt (0.5% of Na$_2$SO$_4$ in the dry dispersant), 0.3 part: of hydroxymethylchloroacetamide, 5 parts: of sodium lactate (60% aqueous solution), 5 parts: of glycerol, 7 parts: of betaine monohydrate and 1.5 parts: of sodium polyacrylate (MW 15,000), and the mixture is homogenized at room temperature (RT; +15° to +25° C.) for about 20 minutes. The dye suspension obtained is then milled in an open mill by means of 200 parts of siliquartzite beads (φ2 mm) over a period of 20 hours, until the average particle size of the dye is about 1μ.

The milling beads are separated off to give a liquid dye preparation which has a very long shelf life of over 2 months at −10° C., RT, +40° C. and +50° C. Virtually no sedimentation and phase separation are observed.

If this dye preparation is used for padding a PES/Cel 67:33 fabric in a concentration of 25 g/l padding liquor with the addition of 10 g/l of a migration inhibitor based on polyacrylamide, a level yellow dyeing is obtained.

If this dye preparation is used together with reactive dyes in a one-bath thermosol-thermofixing process with the addition of 10 g/l of NaHCO$_3$ and 10 g/l of the migration inhibitor on a PES/Cel 67:33 fabric, a level brilliant dyeing is obtained after washing without staining of the PES fabric by the reactive dye or of the Cel fabric by the disperse dye in good colour yields of the disperse and reactive dyes.

EXAMPLE 2

24.1 parts of the disperse dye C.I. Disperse Orange 45 are added slowly in the form of a dry crude dye with vigorous stirring to a solution containing:

48.2 parts: of water
8 parts: of biphenylmethylnaphthalenesulfonic acid condensation product, sodium salt (0.5% of Na$_2$SO$_4$ in the dry dispersant),
0.3 part: of hydroxymethylchloroacetamide,
5 parts: of sodium lactate (60% aqueous solution),
7 parts: of betaine monohydrate
5 parts: of glycerol, and
2.4 parts: of sodium polyacrylate (MW 2500), and the mixture is homogenized at room temperature for about 20 minutes. This dye suspension is then milled in an open mill by means of 200 parts of siliquartzite beads ($\phi$2 mm) over a period of 4 hours, until the average particle size of the dye is about 1$\mu$.

The milling beads are separated off to give a liquid dye preparation which has a very long shelf life of over 2 months at +50° C., +40° C., RT and −10° C. Virtually no sedimentation and phase separation are observed; the preparation is highly redispersible.

EXAMPLE 3

The procedure of Example 2 is repeated, except that 5 parts of sodium lactate (60% aqueous solution) and 1 part of glycerol are used instead of 5 parts of glycerol, to give a dye preparation which has a higher viscosity and the same long shelf life.

EXAMPLE 4

53.8 parts of a moist presscake (corresponding to 20.6 parts of dry crude dye and 33.2 parts of water) of the disperse dye of the formula

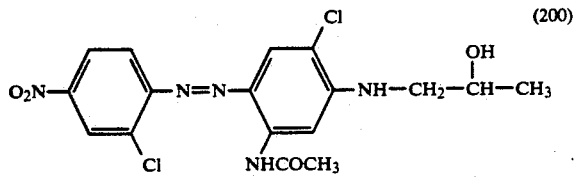

(200)

are added with vigorous stirring to a solution containing:
16.6 parts: of water
10 parts: of biphenylmethylnaphthalenesulfonic acid condensation product, sodium salt, in the same grade as in Example 1,
0.3 part: of hydroxymethylchloroacetamide,
7 parts: of sodium lactate (60% aqueous solution),
3 parts: of glycerol,
7 parts: of betaine monohydrate,
2 parts: of sodium polyacrylate (MW 15,000) and
0.3 part: of sodium polystyrenesulfonate (MW about 500,000), and the mixture is homogenized at room temperature for about 20 minutes. This dye suspension is then milled in an open mill by means of 200 parts of siliquartzite beads ($\phi$2 mm) over a period of 7 hours, until the average dye particle size is about 1$\mu$.

The milling beads are separated off to give a liquid dye preparation which has a long shelf life of over 1 month at +50° C., +40° C., RT and −10° C. Virtually no sedimentation and phase separation are observed.

If this dye preparation is used under the same conditions as the preparation in Example 1, it has low migration and together with reactive dyes produces a level red dye without staining of the PES fabric by the reactive dye or the Cel fabric by the disperse dye in a good colour yield of both dyes.

EXAMPLE 5

44.5 parts of a moist presscake (corresponding to 27.5 parts of dry crude dye and 17.0 parts of water) of the disperse dye C.I. Disperse Yellow 88 are added with vigorous stirring to a solution containing:

29.2 parts: of water
8 parts: of biphenylmethylnaphthalenesulfonic acid condensation product, sodium salt, in the same grade as in Example 1,
0.3 part: of hydroxymethylchloroacetamide,
4 parts: of glycerol,
5 parts: of sodium lactate (60% aqueous solution),
7 parts: of betaine monohydrate and
2 parts: of sodium polyacrylate (MW 15,000)

and the mixture is homogenized at room temperature for about 20 minutes. The dye suspension is then milled in an open mill by means of 200 parts of siliquartzite beads ($\phi$2 mm) over a period of 5 hours, until the average dye particle size is about 1$\mu$.

The milling beads are separated off to give a liquid dye preparation which has a long shelf life of over 2 months at +50° C., +40° C., RT and −10° C. Virtually no sedimentation and phase separation are observed.

If this dye preparation is used together with reactive dyes as in Example 1, a level dyeing is obtained without staining of the PES fabric by the reactive dye or the Cel fabric by the disperse dye in a good colour yield of the disperse and reactive dyes.

EXAMPLE 6

The procedure of Example 5 is repeated, except that only 2 parts of sodium lactate (60% solution) and a total of 7 parts of glycerol are used instead of 5 parts of sodium lactate (60% solution), to give a preparation which likewise has a long shelf life of up to 2 months at RT.

EXAMPLE 7

43.4 parts of a moist presscake (corresponding to 22 parts of dry crude dye and 21.4 parts of water) of the disperse dye C.I. Disperse Red 82 are added with vigorous stirring to a solution containing:
18.8 parts: of water 8.5 parts: of biphenylmethylnaphthalenesulfonic acid condensation product, sodium salt, in the same grade as in Example 1,
0.3 part: of hydroxymethylchloroacetamide,
6.0 parts: of glycerol,
4.0 parts: of sodium lactate (60% aqueous solution),
7.0 parts: of betaine monohydrate and
12.0 parts: of sodium polyacrylate (MW 2,500) (45% aqueous solution)

and the mixture is homogenized at room temperature for about 20 minutes. This dye suspension is then milled in an open mill by means of 200 parts of siliquartzite beads ($\phi 2$ mm) over a period of 15 hours, until the average dye particle size is about $1\mu$.

The milling beads are separated off to give a liquid dye preparation which has a long shelf life of over 1 month at $+50°$ C., $+40°$ C. and $-10°$ C. and minimum sedimentation.

If this dye preparation is used under the same conditions as the preparation in Example 1, it has low migration and a good colour yield on the polyester material.

EXAMPLE 8

44.3 parts of a moist presscake (corresponding to 22 parts of dry crude dye and 22.3 parts of water) of the disperse dye of the formula

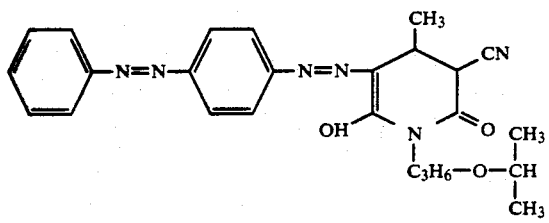

are added with vigorous stirring to a solution containing:
23.9 parts: of water
8.5 parts: of biphenylnaphthalenesulfonic acid condensation product, sodium salt, in the same grade as in Example 1,
0.3 part: of hydroxymethylchloroacetamide,
5.0 parts: of glycerol,
5.0 parts: of sodium lactate (60% aqueous solution)
7.0 parts: of betaine monohydrate and
6.0 parts: of sodium polyacrylate (MW 2,500) (45% aqueous solution)

and the mixture is homogenized at room temperature for about 20 minutes. This dye suspension is then milled in an open mill by means of 200 parts of siliquartzite beads ($\phi 2$ mm) over a period of 15 hours, until the average dye particle size is about $1\mu$.

The milling beads are separated off to give a liquid dye preparation which has a long shelf life of over 1 month at $+50°$ C., $+40°$ C. and $-10°$ C.

If this dye preparation is used under the same conditions as the preparation in Example 1, it has low migration and a good colour yield on the polyester material.

EXAMPLE 9

24.4 parts of a moist presscake (corresponding to 22.9 parts of dry crude dye and 1.5 parts of water) of the disperse dye C.I. Disperse Blue 165 are added with vigorous stirring to a solution containing:
48.3 parts: of water
8.0 parts: of biphenylnaphthalenesulfonic acid condensation product, sodium salt, in the same grade as in Example 1,
0.3 part: of hydroxymethylchloroacetamide,
4.0 parts: of glycerol,
6.0 parts: of sodium lactate (60% aqueous solution),
7.0 parts: of betaine monohydrate and
2.0 parts: of sodium polyacrylate powder (MW 15,000)

and the mixture is homogenized at room temperature for about 20 minutes. This dye suspension is then immediately milled while wet and isolated as in Example 8.

A liquid dye preparation is obtained which has a long shelf life of 2 months at $+50°$ C., $+40°$ C. and $-10°$ C. and minimum sedimentation.

When applied as in Example 4, this dye preparation produces good compatibility with reactive dyes and a good polyester colour yield.

EXAMPLE 10

31.6 parts of a moist presscake (corresponding to 22.7 parts of dry crude dye and 8.9 parts of water) of the disperse dye C.I. Disperse Blue 130 are added with vigorous stirring to a solution containing:
31.6 parts: of water
12.5 parts: of biphenylnaphthalenesulfonic acid condensation product, sodium salt, in the same grade as in Example 1,
0.3 part: of hydroxymethylchloroacetamide,
1.0 part: of glycerol,
8.0 parts: of sodium lactate (60% aqueous solution),
7.0 parts: of betaine monohydrate and
8.0 parts: of sodium polyacrylate (MW 2,500) (45% aqueous solution)

and the mixture is homogenized at room temperature for about 20 minutes. This dye suspension is then immediately milled while wet and isolated as in Example 8.

A liquid dye preparation is obtained which has a long shelf life of over 1 month at $+50°$ C., $+40°$ C. and $-10°$ C. and good redispersibility and minimum sedimentation.

EXAMPLE 11

The procedure of Example 10 is repeated, except that 12.5 parts of a ditolyl ether sulfonic acid formaldehyde condensation product, sodium salt, in a low-salt form (0.8% of $Na_2SO_4$ in the dry dispersion) are used instead of 12.5 parts of biphenylnaphthalenesulfonic acid condensation product, sodium salt, to give a dye preparation which has the same long shelf life and a good redispersibility as the preparation according to Example 10.

EXAMPLE 12

20.7 parts of the disperse dye C.I. Disperse Blue 333 are added in the form of a dry crude dye with vigorous stirring to a solution containing:
44.0 parts: of water
10.0 parts: of biphenylnaphthalenesulfonic acid condensation product, sodium salt, in the same grade as in Example 1,
0.3 part: of hydroxymethylchloroacetamide,
4.0 parts: of glycerol,
6.0 parts: of sodium lactate (60% aqueous solution),
8.0 parts: of betaine monohydrate and
7.0 parts: of sodium polyacrylate (MW 2,500) (45% aqueous solution)

and the mixture is homogenized at room temperature for about 20 minutes. This dye suspension is then immediately milled while wet and isolated as in Example 8.

A liquid dye preparation is obtained which has a long shelf life of over 1 month at +50° C., +40° C. and −10° C. and minimum sedimentation.

EXAMPLE 13

59.3 parts: of the dye preparation according to Example 10 are mixed with 36.3 parts: of the dye preparation according to Example 11, 2.0 parts: of betaine monohydrate and 2.4 parts: of sodium polyacrylate (MW 2,500) (45% aqueous solution), and the mixture is homogenized for 2 hours with stirring. A liquid dye preparation is obtained which has a long shelf life of over 1 month at +50° C., +40° C. and −10° C., good redispersibility and minimum sedimentation.

When using this dye preparation under the same conditions as the preparation in Example 1, it has low migration and a good colour yield on the polyester material.

EXAMPLE 14

64.0 parts: of the dye preparation according to Example 9 are mixed with 29.1 parts: of the dye preparation according to Example 11, 4.0 parts: of glycerol and 2.9 parts: of sodium polyacrylate (MW 2,500) (45% aqueous solution), and the mixture is homogenized for 2 hours with stirring. A liquid dye preparation is obtained which has a long shelf life of over 1 month at +50° C., +40° C. and −10° C., good redispersibility and minimum sedimentation.

When using this dye preparation under the same conditions as the preparation in Example 1, it has low migration and a good colour yield on the polyester material.

What is claimed is:

1. An aqueous dye preparation of a dye, which contains 15-40% by weight of insoluble to sparingly soluble dye, 3-18% by weight of an anionic dispersant of the general formula

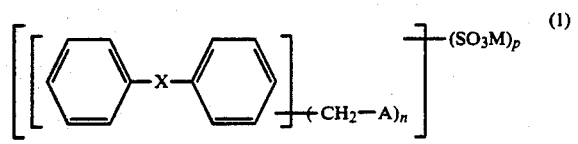

in which

X is a direct bond or oxygen

A is hydrogen or the radical of an aromatic compound, which is bound to the methylene group via a ring carbon atom and has no hydroxyl or amino substituents n and p, independently of one another, are each a number from 1 to 4 and M is a monovalent cation, and if appropriate, condensation products of these compounds with formaldehyde, 1-10% by weight of sodium lactate, 1-10% by weight of glycerol and/or propylene glycol, 0.1-5.0% by weight of a compound having monomer units of the general formula

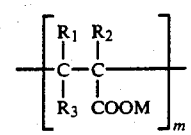

in which $R_1$ is H, $C_1$-$C_3$alkyl, COOM $R_2$ is H, $C_1$-$C_3$alkyl, $R_3$ is H, $C_1$-$C_3$alkyl, $CH_2COOM$ M is a monovalent cation and m is a number from 8-1000, 3-10% by weight of betaine monohydrate, 0-4% by weight of a compound having monomer units of the general formula

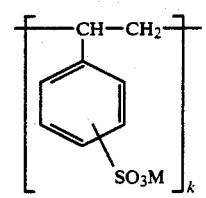

in which M is a monovalent cation and k is a number from 50 to 3000, and 0.1-15% by weight of customary auxiliaries.

2. An aqueous dye preparation according to claim 1, which contains 15-40% by weight of disperse dye, 3-18% by weight of an anionic dispersant of the general formula

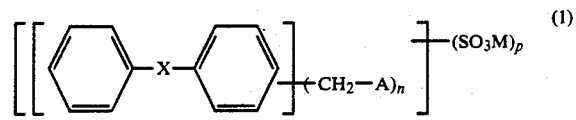

in which

X is a direct bond or oxygen

A is the radical of an aromatic compound, which is bound to the methylene group via a ring carbon atom and has no hydroxyl or amino substituents n and p, independently of one another, are each a number from 1 to 4 and M is a monovalent cation, 1-10% by weight of sodium lactate 1-10% by weight of glycerol and/or propylene glycol 0.1-5.0% by weight of a compound having monomer units of the general formula

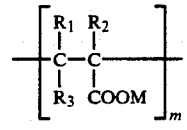

in which $R_1$ is H, $C_1$-$C_3$alkyl, COOM
$R_2$ is H, $C_1$-$C_3$alkyl,
$R_3$ is H, $C_1$-$C_3$alkyl, $CH_2COOM$
M is a monovalent cation and
m is a number from 8-1000,
3-10% by weight of betaine monohydrate,
0-4% by weight of a compound having monomer units of the general formula

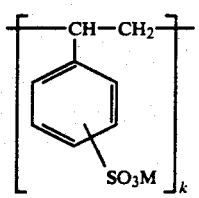
(3)

in which M is a monovalent cation and
k is a number from 50 to 3000, and
0.1-15% by weight of customary auxiliaries.

3. An aqueous dye preparation according to claim 2, wherein the anionic dispersant has the general formula

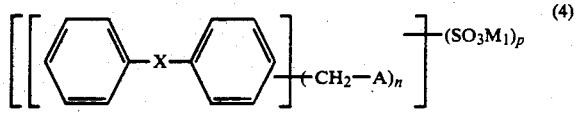
(4)

in which
X is a direct bond or oxygen,
A is the radical of an aromatic compound which is bound to the methylene group via a ring carbon atom and has no hydroxyl or amino substituents,
n and p, independently of one another, are each a number from 1 to 4 and
$M_1$ is Na, K, Li or triethanolamine.

4. An aqueous dye preparation according to claim 3, wherein the anionic dispersant has the general formula

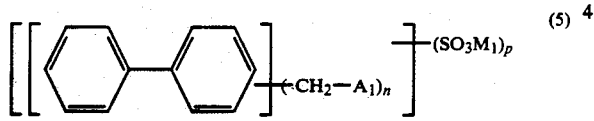
(5)

in which
$A_1$ is the radical of an aromatic hydrocarbon which is bound to the methylene group via a ring carbon atom and has no hydroxyl or amino substituents,
n and p, independently of one another, are each a number from 1 to 4 and
$M_1$ is Na, K, Li or triethanolamine.

5. An aqueous dye preparation according to claim 4, wherein the anionic dispersant has the general formula

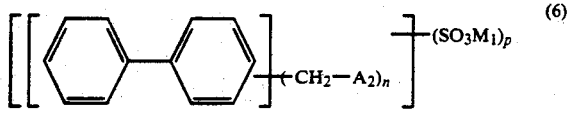
(6)

in which $A_2$ is a naphthalene radical which is bound to the methylene group via a ring carbon atom and has no hydroxyl or amino substituents,
n and p, independently of one another are each a number from 1 to 4 and
$M_1$ is Na, K, Li or triethanolamine.

6. An aqueous dye preparation according to either of claims 1 or 2, wherein the anionic dispersant of the formula (1) has a carbon to organically bound sulfur ratio >15:1 and the amount of electrolyte in the dry dispersant, expressed as $Na_2SO_4$, is less than 1% by weight.

7. An aqueous dye preparation according to either of claims 1 or 2, wherein the compound of the general formula (2) is sodium polyacrylate, sodium polymethacrylate, sodium polymaleate, mixtures thereof or copolymers thereof having a molecular weight between 1,000 and 100,000.

8. An aqueous dye preparation according to claim 7, wherein the compound of the general formula (2) is sodium polyacrylate, sodium polymethacrylate, sodium polymaleate, mixtures thereof or copolymers thereof having a molecular weight between 1,000 and 30,000.

9. An aqueous dye preparation according to either of claims 1 or 2, wherein the sum of the mixture of sodium lactate and glycerol and/or propylene glycol amounts to about 7-12% by weight of the dye preparation.

10. An aqueous dye preparation according to either of claims 1 or 2, wherein the compounds of the general formula (3) have a molecular weight between 400,000 and 600,000, calculated as the sodium salts.

11. An aqueous dye preparation according to either of claims 1 or 2, which contains
15-40% by weight of disperse dye,
3-18% by weight of the anionic dispersant of the general formula

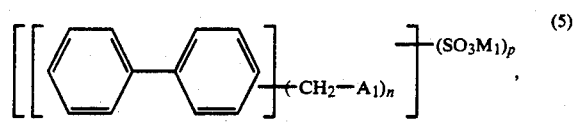
(5)

in which
$A_1$ is the radical of an aromatic hydrocarbon which is bound to the methylene group via a ring carbon atom and has no hydroxyl or amino substituents,
n and p, independently of one another, are each a number from 1 to 4 and
$M_1$ is Na, K, Li or triethanolamine,
1-10% by weight of sodium lactate,
1-10% by weight of glycerol and/or propylene glycol,
0.1-5% by weight of sodium polyacrylate, sodium polymethacrylate, sodium polymaleate, mixtures thereof or
copolymers thereof having a molecular weight between 1,000 and 100,000,
3-10% by weight of betaine monohydrate,
0-4% by weight of a compound having monomer units of the general formula

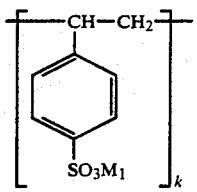

(7)

in which

M is Na, K, Li, triethanolamine and k is a number from 50 to 3000, and 0.1–15% by weight of customary auxiliaries.

12. An aqueous dye preparation according to claim 11, which contains

18–32% by weight of disperse dye,

5–12% by weight of the anionic dispersant of the general formula

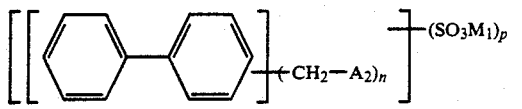

(6)

in which $A_2$ is a naphthalene radical which is bound to the methylene group via a ring carbon atom and has no hydroxyl or amino substituents, n and p, independently of one another, are each a number from 1 to 4, $M_1$ is Na, K, Li or triethanolamine, 7–12% by weight of a mixture of sodium lactate and glycerol and/or 1,2-propylene glycol, 1–3% by weight of sodium polyacrylate having a molecular weight between 1,000 and 30,000, 5–9% by weight of betaine monohydrate, 0–1% by weight of sodium polystyrenesulfonate having a molecular weight between 400,000 and 600,000, and 0.1–5% by weight of customary auxiliaries.

13. An aqueous dye preparation according to claim 1, wherein the preparations additionally contain a reactive dye which is insoluble to sparingly soluble in water.

14. A process for the preparation of an aqueous dye preparation according to claim 1, which comprises milling the dye which is insoluble to sparingly soluble in water with addition of the anionic dispersant of the general formula (1) down to a particle size of less than $10\mu$, the remaining components being added before, during or after the milling process.

15. A textile material dyed with a dye preparation according to claim 1.

16. A method preparing a dye liquor which comprises diluting an aqueous dye preparation of claim 1.

17. A method of preparing a printing paste which comprises combining an aqueous dye preparation of claim 1 with a natural thickener.

18. A method of dyeing textile material composed of polyester or mixtures of polyester and cellulose which comprises continuously dyeing the textile material with a dye liquor prepared from an aqueous dye preparation of claim 1.

* * * * *